(12) United States Patent
Swartz

(10) Patent No.: US 6,847,715 B1
(45) Date of Patent: Jan. 25, 2005

(54) METHOD AND SYSTEM FOR INFORMING CALLERS WITHIN A QUEUE

(75) Inventor: Jeff H. Swartz, Coral Spring, FL (US)

(73) Assignee: Interactive Intelligence, Inc., Indianapolis, IN (US)

( * ) Notice: Subject to any disclaimer, the term of this patent is extended or adjusted under 35 U.S.C. 154(b) by 630 days.

(21) Appl. No.: 09/614,781

(22) Filed: Jul. 12, 2000

Related U.S. Application Data

(60) Provisional application No. 60/186,190, filed on Mar. 1, 2000, and provisional application No. 60/143,460, filed on Jul. 13, 1999.

(51) Int. Cl.[7] ................................................ H04M 3/00
(52) U.S. Cl. .............................. 379/266.01; 379/265.08
(58) Field of Search ..................................... 379/265.01

(56) References Cited

U.S. PATENT DOCUMENTS

| | | | |
|---|---|---|---|
| 4,788,715 A | 11/1988 | Lee | 379/84 |
| 5,444,774 A | 8/1995 | Friedes | 379/266 |
| 5,479,487 A | * 12/1995 | Hammond | 379/265 |
| 5,802,526 A | * 9/1998 | Fawcett et al. | 399/88 |
| 5,978,467 A | * 11/1999 | Walker et al. | 379/266 |
| 6,014,439 A | 1/2000 | Walker et al. | 379/266 |
| 6,324,276 B1 | * 11/2001 | Uppaluru et al. | 379/220.01 |

* cited by examiner

*Primary Examiner*—Creighton Smith
(74) *Attorney, Agent, or Firm*—Woodard Emhardt Moriarty McNett & Henry LLP

(57) ABSTRACT

A system for implementing a technique for operatively integrating an automatic call distributor and an interactive voice response unit is disclosed. Upon receiving and storing an interaction input from a caller seeking information, the automatic call distributor determines the availability of an agent workstation to respond to the interaction input. The interactive voice response unit provides the caller with access to the information when the automatic call distributor determines an agent workstation is unavailable to respond to the interaction input. The automatic call distributor transmits the interaction input to an appropriate agent workstation whenever that particular agent workstation becomes available to respond to the interaction input.

14 Claims, 3 Drawing Sheets

METHOD AND SYSTEM FOR INFORMING CALLERS WITHIN A QUEUE

REFERENCE TO RELATED APPLICATIONS

Benefit is claimed under 35 U.S.C. § 119(e) based on U.S. Provisional Patent Application No. 60/143,460, filed Jul. 13, 1999, and U.S. Provisional Patent Application No. 60/186,190, filed Mar. 1, 2000, which are each hereby incorporated by reference.

BACKGROUND

The present invention generally relates to techniques for providing a caller with information relevant to the caller's call while the call is within a queue, and more particularly, but not exclusively, relates to methods and systems for allowing a caller to access information about products, services, and the like while the call is stored within the queue.

In a call center, a call center agent typically communicates with customers through inbound calls, out-bound calls, or both. This communication is often by voice using a telephone handset or headset component of the agent's workstation. Usually, the workstation also includes a computer terminal or personal computer to interface with various application modules. These modules provide the agent information directed to the particular customer service involved. In one common application, a customer's account information is provided on a display viewable by the agent.

The time it takes agents to handle calls and the lapse of time between calls are factors that influence the efficiency of call center operations. Although sometimes at odds with efficiency goals, it is also generally desirable to provide customers as favorable an impression as possible with regard to call center transactions. To manage such competing interests, there is a continuing demand for further advancements in the call center technology area.

SUMMARY

One form of the present invention is a unique technique for a providing a caller with access to information related to the caller's call while the call is stored within a queue whereby the caller may receive pertinent information prior to the call being removed from the queue. Another form of the present invention is a unique system operable to provide a caller with access to information related to the caller's call while the call is stored within a queue whereby the caller may receive pertinent information prior to the call being removed from the queue. In yet another form of the present invention is a unique telephony server for operatively integrating an automatic call distributor queue and an interactive voice response unit in response to an interaction input whereby the telephony server's capacity to handle incoming calls is increased.

Still further forms, objects, features, aspects, benefits, advantages, and embodiments of the present invention shall become apparent from the detailed description and drawings provided herewith.

DETAILED DESCRIPTION OF SELECTED EMBODIMENTS

Figure 1:
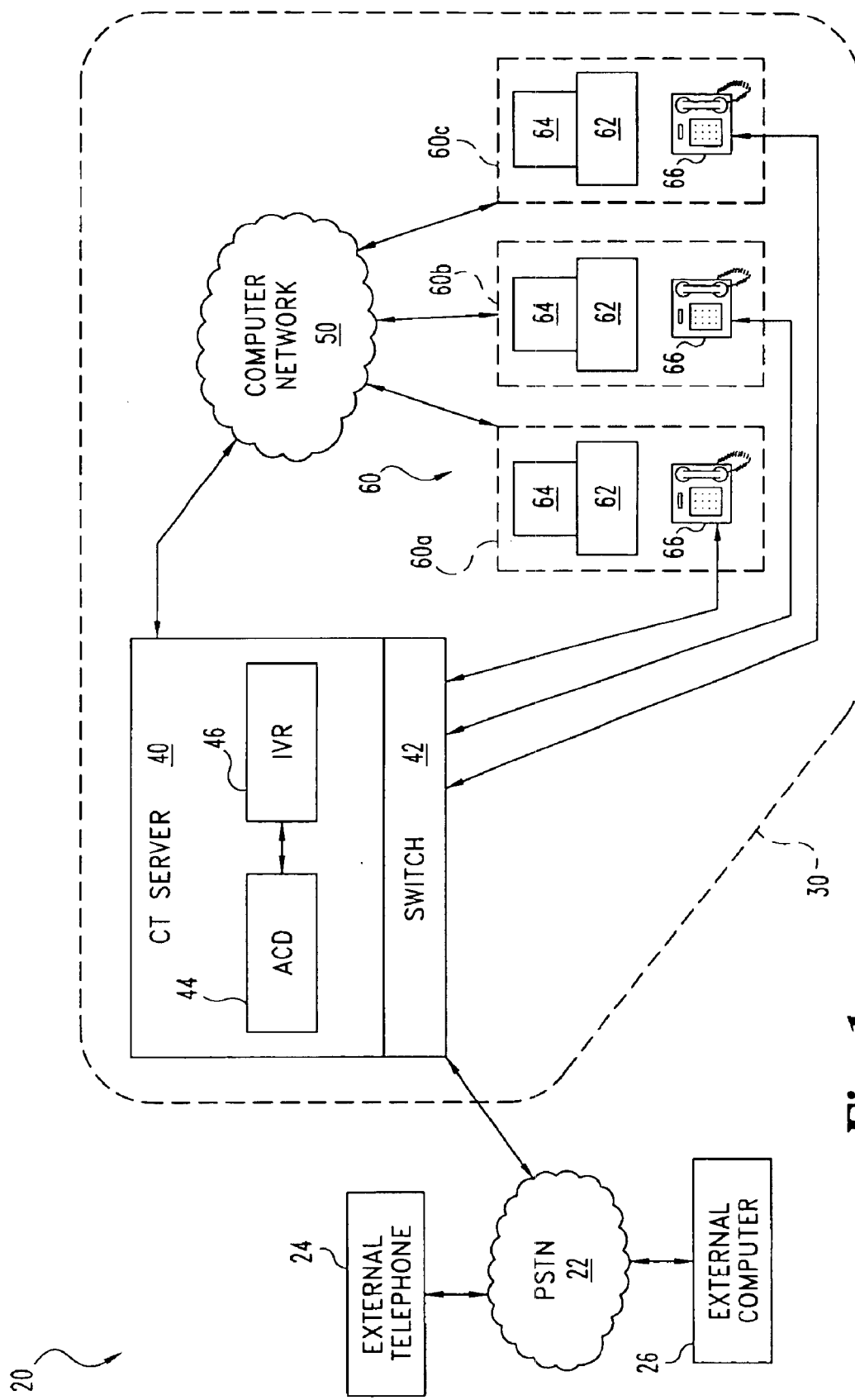
FIG. 1 is a schematic view of a system according to one embodiment of the present invention.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 schematically illustrates call center system 20 of one embodiment of the present invention. System 20 includes Public Switched Telephone Network 22 (hereinafter "PSTN 22") operatively coupled to an external telephone 24 and an external computer 26. While telephone 24 and computer 26 are illustrated, more external telephones and/or more external computers may be utilized in alternative embodiments of system 20.

PSTN 22 is also coupled to a call center 30 of the present invention that includes Computer Telephony server 40 (hereinafter "CT server 40") and a telecommunication switch 42 operatively coupled to PSTN 22 and CT server 40. For this embodiment, telecommunication switch 42 can be in the form of one or more telecommunication processing boards provided by DIALOGIC of 1515 Route Ten, Parsippany, N.J. 07054, USA, or by ACCULAB. Furthermore, while telecommunication switch 42 is illustrated, more telecommunication switches may be utilized in alternative embodiments of call center 30.

CT server 40 includes an automatic call distributor queue 44 (hereinafter "ACD queue 44"), an interactive voice response unit 46 (hereinafter "IVR 46"), and a notifier module 48. Although not shown to preserve clarity, CT server 40 includes one or more processors and one or more types of memory to construct ACD queue 44, IVR 46, and notifier 48 based upon the principles of the present invention as would occur to those skilled in the art. Each processor may be comprised of one or more components configured as a single unit. Alternatively, when of a multi-component form, a processor may have one or more components located remotely relative to the others. One or more components of each processor may be of the electronic variety defining digital circuitry, analog circuitry, or both. In one embodiment, each processor is of a conventional, integrated circuit microprocessor arrangement, such as one or more PENTIUM II or PENTIUM III processors supplied by INTEL Corporation of 2200 Mission College Boulevard, Santa Clara, Calif. 95052, USA.

Each memory may include one or more types of solid-state electronic memory, magnetic memory, or optical memory, just to name a few. By way of nonlimiting example, each memory may include solid-state electronic Random Access Memory (RAM), Sequentially Accessible Memory (SAM) (such as the First-In, First-Out (FIFO) variety or the Last-In First-Out (LIFO) variety), Programmable Read Only Memory (PROM), Electrically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

CT server 40 communicates with telecommunication switch 42 and computer network 50. Accordingly, CT server 40 includes interface software and hardware as would occur to those skilled in the art. CT server 40 may also include any oscillator, control clock, signal conditioner, filter, limiter, converter, and other types of operators to implement the present invention as would occur to those skilled in the art. Furthermore, while CT server 40 is illustrated, more servers may be utilized in alternative embodiments.

Computer network 50 can be in the form of a Local Area Network (LAN), Wide Area Network (WAN) such as the Internet, or other network type as would occur to those skilled in the art. It should be recognized that computer network 50 may include one or more elements of PSTN 22. Indeed, in an alternate embodiment, PSTN 22 and computer network 50 are provided as a common network. A number of agent workstations 60a, 60b, 60c (collectively hereinafter "agent workstations 60") are coupled to computer network 50. Agent workstations 60 each include a computer 62 coupled to a display 64. Computers 62 may be of the same type, or a heterogeneous combination of different computing devices. Likewise, displays 64 may be of the same type, or a heterogeneous combination of different visual devices. Although not shown to preserve clarity, each agent workstation 60 may also include one or more operator input devices such as a keyboard, mouse, track ball, light pen, and/or microtelecommunicator, to name just a few representative examples. Also, besides display 64, one or more other output devices may be included such as loudspeaker(s) and/or a printer.

To communicate with a caller located at telephone 24, each agent workstation 60 further includes a telephone unit 66 as schematically illustrated in FIG. 1, and a dialing module programmed within computer 62. Telephone units 66 may be in the form of a handset, a headset, or another arrangement as would occur to those skilled in the art. The dialing module may be in the form of a soft phone, or another arrangement as would occur to those skilled in the art. In an alternative embodiment, the dialing module can be programmed within CT server 40 and accessible by each agent workstation 60.

Agent workstations 60 may be arranged identical to one another or may differ from one to the next as would occur to those skilled in the art. In one common arrangement, one workstation is designated for an agent supervisor that has different capabilities than those of other workstations. Furthermore, it should be understood that more or fewer workstations may be utilized than those illustrated.

Figure 2:
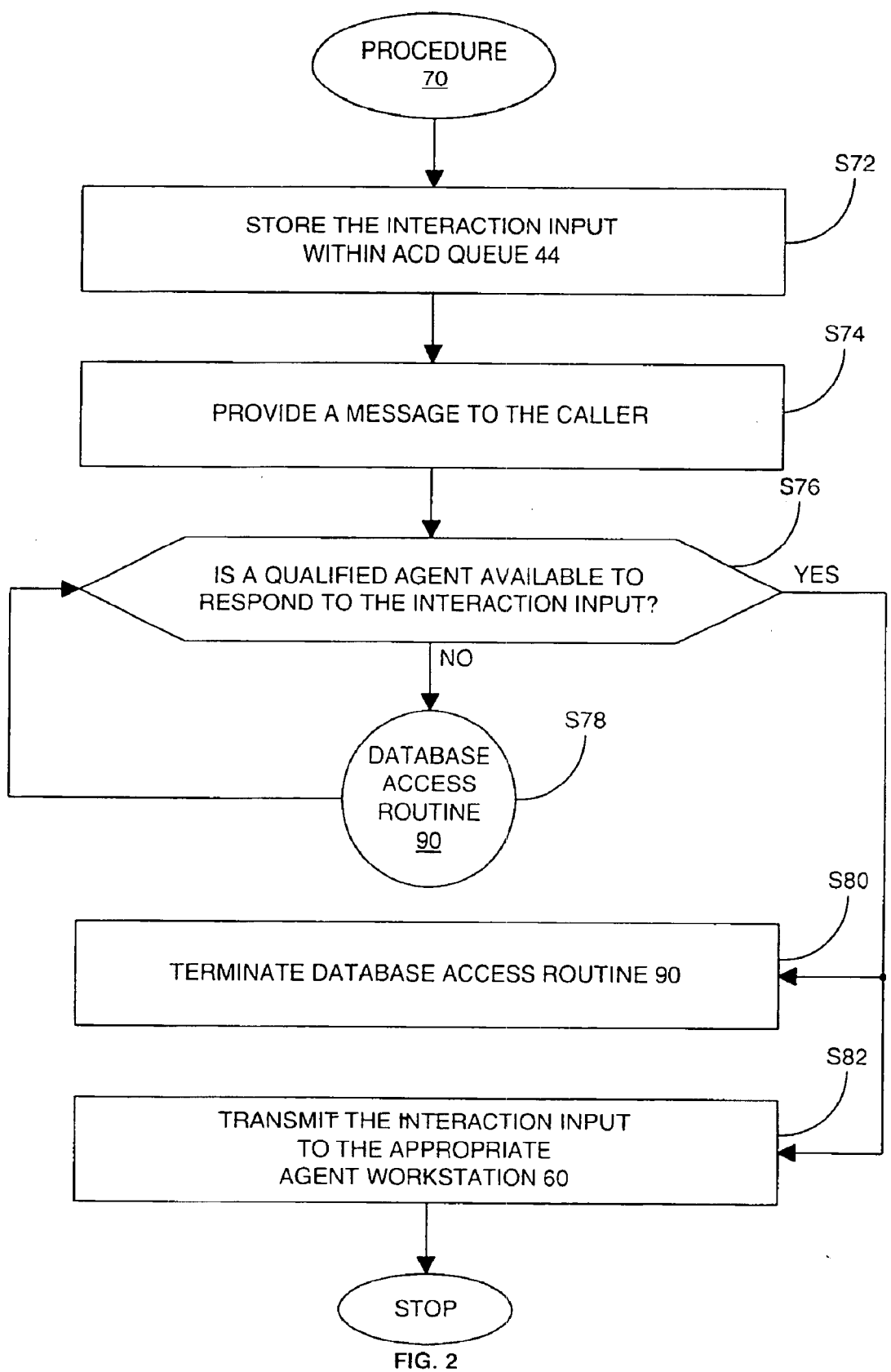
FIG. 2 is a flow chart of one embodiment of an ACD/IVR integration procedure of the present invention.

CT server 40 incorporates a unique technique of the present invention whereby ACD queue 44 and IVR 46 are operatively integrated to enable callers having calls stored within ACD queue 44 to navigate menus while the risk of the calls being removed from ACD queue 44. One embodiment of the technique is ACD/IVR integration procedure 70 shown in FIG. 2. An increased capacity of CT server 40 in handling incoming calls will be clear to those skilled in the art of the present invention with the following description of procedure 70. Referring additionally to FIG. 2, an interaction input from a caller is received by CT server 40 prior to an implementation of procedure 70 by CT server 40. The interaction input can be in the form of a telephone call originating from telephone 24, or in the form of a chat call originating from computer 26. In either case, the caller is typically seeking information relating to a product for sale by call center 30, a service performed by call center 30, a company profile of call center 30, etc. An implementation of procedure 70 by CT server 40 provides access to the caller of such information while the interaction input is stored within ACD queue 44 whereby the caller may search for information pertinent to the call prior to the interaction input being removed from ACD queue 44 and transmitted to an appropriate agent workstation 60. Thus, while awaiting connection to an agent workstation 60, the caller is presented within an opportunity to receive information pertinent to the call and to thereafter terminate the call. As such, an agent workstation 60 would not have to respond to the interaction input if the caller terminated the call after receiving the pertinent information.

CT server 40 will initiate and continually implement procedure 70 in response to an initial and continual reception of the interaction input. Thus, upon a termination of a reception of the interaction input, CT server 40 immediately ceases an implementation of procedure 70 regardless of which stage or stages of procedure 70 CT server 40 is actively employing. Upon an initial reception of an interaction input, CT server 40 places the interaction input into ACD queue 44 during stage S72 of procedure 70. Upon completion of stage S72, CT server 40 directs IVR 46 during stage S74 to provide a message to the caller of the interaction input. In one embodiment, the message includes a greeting for the caller and an estimated holding period of the interaction input within ACD queue 44.

While the message is being provided to the caller during stage S74, ACD queue 44 is executing a queue management routine as would occur to those skilled in the art for routing the interaction input from ACD queue 44 to an available agent workstation 60. The output of the queue management routine is tested during stage S76 of procedure 70. If the output of the queue management routine initially indicates that an agent workstation 60 is available to respond to the interaction input, CT server 40 proceeds to stage S82 wherein the interaction input is transmitted to the appropriate agent workstation 60 and procedure 70 is thereafter terminated. If the output of the queue management routine initially indicates that none of the agent workstations 60 is available to respond to the interaction input, then CT server 40 proceeds to execute a database access routine 90 during stage S78 of procedure 70.

Figure 3:
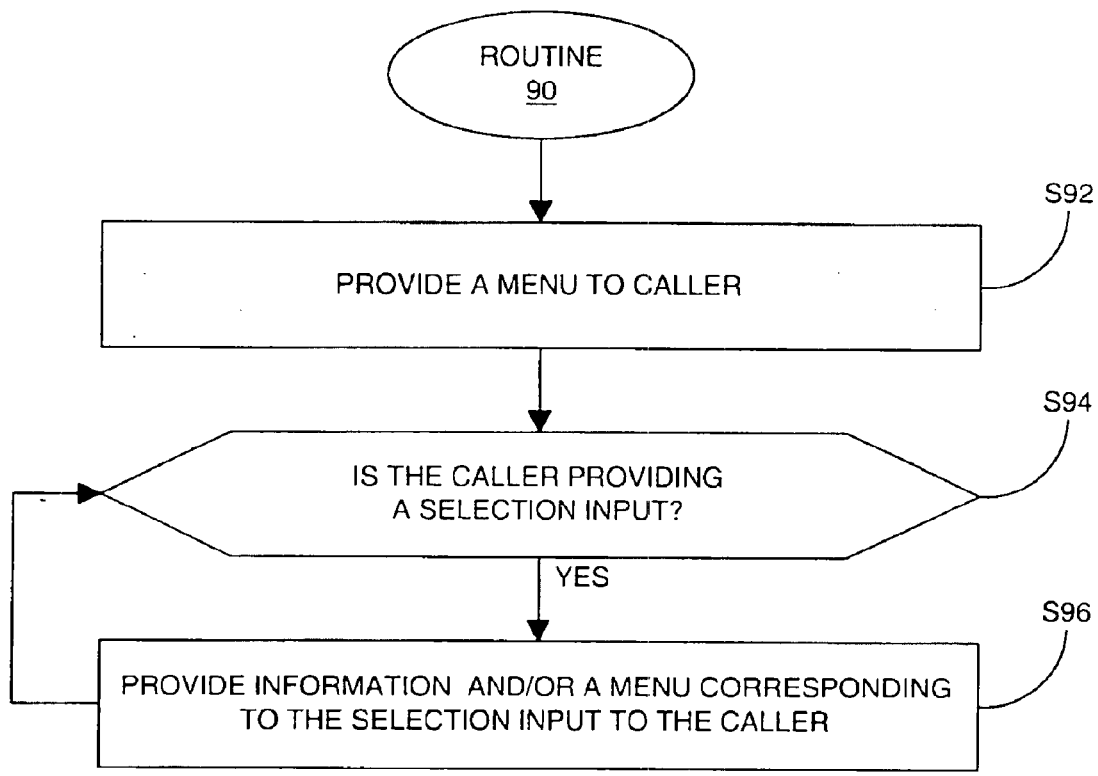
FIG. 3 is a flow chart of one embodiment of an access routine executed as part of the ACD/IVR integration procedure of FIG. 2.

Referring additionally to FIG. 3, CT server 40 is operable to provide information to the caller from either one or more databases (not shown) of call center 30 and/or handlers of CT server 40 in response to one or more selection inputs from the caller. To his end, during stage S92 of routine 90, IVR 46 provides a menu to the caller whereby the caller can navigate the menu in order to obtain any sough after information from the databases. The menu is audibly transmitted to telephone 24 if the interaction input originated from telephone 24, and is displayed on computer 26 if the interaction input originated from computer 26. Thereafter, CT server 40 awaits a reception of a selection input from the caller during stage S94.

Upon reception of a selection input, CT server 40 proceeds to stage S96 wherein either CT server 40 provides information corresponding to the selection input and/or IVR 46 provides an additional menu corresponding to the selection input. In either case, CT server 40 then proceeds to stage S94 to await a reception of another selection input. CT server 40 will thereafter continually execute stage S94 and/or stage S96 until one of two events occur. The first event is an indication by ACD 44 queue that one or more agent workstations 60 are available to respond to the interaction input. CT server 40 will then proceed to stage S80 to terminate the execution of routine 90 and to stage S82 to transmit the interaction input to an appropriate workstation 60. Upon completion of stage S80 and stage S82, CT server 40 terminates an implementation of procedure 70.

The second event is a termination of a transmission of the interaction input from the caller, e.g. the caller hangs up telephone 24, or the caller closes a program on computer 26. For this event, CT server 40 immediately terminates an implementation of procedure 70 regardless of which stage or stages of procedure 70 currently being employed by CT server 40. However, prior to the caller's termination of the interaction input, the caller was presented with an opportunity to receive sought after information without the risk of the interaction input being removed from ACD queue 44. Thus, call center 30 becomes more efficient as a function of the number of callers receiving information pertinent to their calls without having to communicate with an agent workstation 60.

Referring to FIG. 1, an enterprise system as an alternative embodiment of the present invention comprises CT server 40, telecommunication switch 42, and conventional components as would occur to those skilled in the art. Additionally, a service providing system as an alternative embodiment of the present invention comprises CT server 40, telecommunication switch 42, and conventional components as would occur to those skilled in the art. Both the enterprise system embodiment and the service providing system embodiment implement the principles of the present invention.

All publications, patents, and patent applications cited in this specification are herein incorporated by reference as if each individual publication, patent, or patent application were specifically and individually indicated to be incorporated by reference and set forth in its entirety herein. While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected.

What is claimed is:

1. A method, comprising:
   receiving an interaction input from a caller seeking information;
   storing said interaction input within a queue;
   determining an availability of at least one agent to provide said information to said caller;
   operating an interactive voice response unit to prompt said caller to provide a selection input corresponding to said information only if said at least one agent is unavailable to provide said information; and
   wherein said operating includes providing a first menu to said caller with said interactive voice response unit, said first menu being responsive to said selection input to provide a second menu to said caller corresponding to said information.

2. The method of claim 1 wherein said interaction input is a telephone call.

3. The method of claim 1 wherein said interaction input is a chat call originating from a computer.

4. The method of claim 1 wherein said interaction input is continually stored within said queue while said at least one agent is unavailable to provide said information.

5. The method of claim 1 further comprising:
   deactivating said interactive voice response unit in response to a first agent of said at least one agent becoming available to provide said information.

6. The method of claim 1 further comprising:
   deactivating said interactive voice response unit in response to a termination of said reception of said interaction input.

7. A system, comprising: a telephony server, including
   an ACD defining a queue operable to determine an availability of at least one agent to provide information to a caller in response to an interaction input from said caller;
   an interactive voice response unit operable to prompt said caller to provide a selection input corresponding to said information only if said queue determines said at least one agent is unavailable to provide said information, said ACD and said interactive voice response unit being integrated together within said telephony server; and
   wherein said interactive voice response unit is operable to provide a first menu, said first menu being responsive to said selection input to provide a second menu corresponding to said:
   information.

8. The system of claim 7 wherein said queue is further operable to store said interaction input while said interactive voice response unit is providing said caller with access to said information.

9. The system of claim 7, wherein said interaction input is a telephone call.

10. The system of claim 7 wherein said interaction input is a chat call.

11. A method, comprising:
    receiving an interaction input from a caller seeking information;
    storing the interaction input within a queue;
    determining unavailability of several agents to communicate with the caller before prompting the caller with a first menu of an interactive voice response unit to provide an input to select the information; and
    responding to the input by providing the caller a second menu of the interactive voice response unit, the second menu corresponding to the information.

12. The method of claim 11, wherein the queue is of an ACD type, and the queue and the interactive voice response unit are integrated together within a telephony server.

13. The method of claim 11, which includes connecting the caller to one of the agents when the one of the agents becomes available to provide the information.

14. The method of claim 11, which includes providing the caller the information with the interactive voice response unit.

* * * * *